(No Model.)
W. NEWCOMB.
FAUCET COUPLING.
No. 274,361. Patented Mar. 20, 1883.
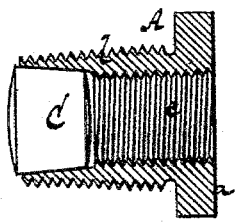
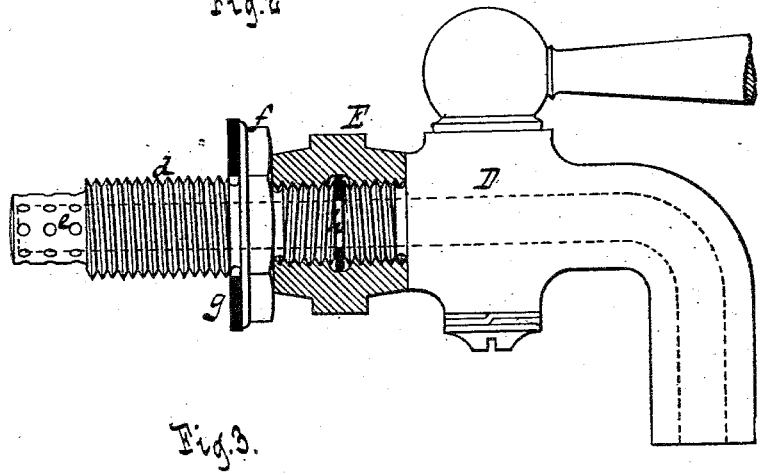
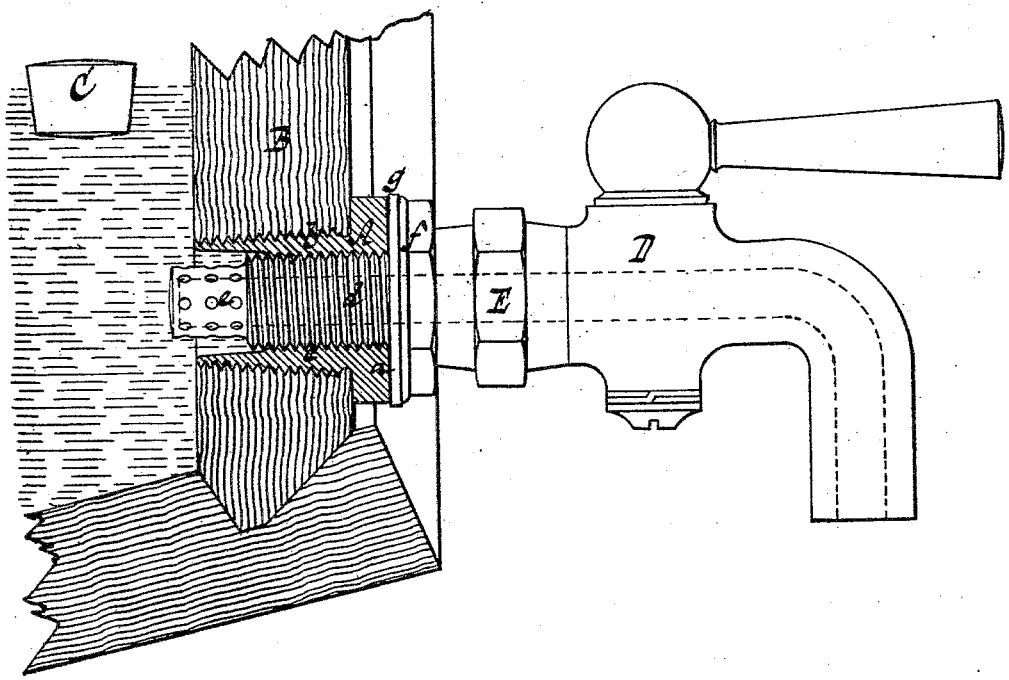
WITNESSES:
INVENTOR
William Newcomb
BY Van Santvoord & Hauff,
ATTORNEYS

UNITED STATES PATENT OFFICE.

WILLIAM NEWCOMB, OF JOHNSONVILLE, NEW YORK.

FAUCET-COUPLING.

SPECIFICATION forming part of Letters Patent No. 274,361, dated March 20, 1883.

Application filed July 6, 1882. (No model.)

*To all whom it may concern:*

Be it known that I, WILLIAM NEWCOMB, a citizen of the United States, residing at Johnsonville, in the county of Rensselaer and State of New York, have invented new and useful Improvements in Faucet-Couplings, of which the following is a specification.

This invention relates to improvements in that class of devices which are employed to tap barrels or casks of liquid; and the object of the invention is to improve the construction of the tap-hole bush and the connection of the faucet with the screw-shank which enters the bush to remove the plug therefrom and permit the flow of the liquid to the faucet.

The object of my invention I accomplish by the construction of devices illustrated in the accompanying drawings, in which—

Figure 1 represents a section of the tap-hole bush detached. Fig. 2 is a section of the faucet. Fig. 3 is a section of a barrel-head provided with my faucet-coupling.

Similar letters indicate corresponding parts.

In the drawings, the letter A designates my tap-hole bush, which is composed of a head, $a$, and a hollow screw-shank, $b$. The head $a$ is hexagonal or otherwise so formed that a wrench can be applied to it, and the shank $b$ is provided on its outer surface with a screw-thread to be screwed into the head B of a barrel, as shown in Fig. 3.

The bore of my bush is provided in its outer portion with a screw-thread, $c$, and the inner portion of said bore is enlarged and made slightly tapering with a smooth surface, so that a plug, C, of wood or other suitable material, can be driven into it.

The outer portion of the bore of the bush is intended to receive the shank of the faucet D, which is provided with a screw-shank, $d$, that fits the internal screw-thread, $c$, of the bush, and is of such a length that when it has been screwed in a short distance its inner end bears against the plug C, and as the faucet is screwed home the plug is driven out of the inner end of the bush, thereby establishing a free communication between the interior of the barrel and the faucet.

In the example shown in the drawings the screw-shank of the faucet terminates at its inner end in a strainer, $e$, and its outer end is provided with a flanged head, $f$, and a packing-ring, $g$, so that when the faucet is screwed home a tight joint will be produced between it and the bush A.

It will be observed that the screw-shank $d$ is made separate from the faucet D, and that the shank and faucet are provided respectively with a right and left hand screw-threaded extension, which are united by a coupling, E. This coupling is provided in one end with a right-handed and in the other end with a left-handed screw-thread, so that when both the shank and the faucet are held stationary and the coupling is turned in the proper direction the end of the faucet is drawn up toward the end of the shank. In the interior of the coupling is placed a packing-ring, $h$, and when the faucet and the shank are drawn toward each other their ends press against this packing-ring from opposite sides, and a tight joint is produced.

By connecting the faucet and the shank through the instrumentality of the coupling E, in the manner described, it will be obvious that in the act of connecting the shank and faucet the latter can be held stationary as regards rotary movement, with its discharge-nozzle depending in proper vertical position to discharge into a receptacle supported under the same while the coupling is rotated to draw the shank and the faucet together, thereby obtaining a perfectly tight joint, and at the same time retaining the faucet in proper adjustment with its discharge-nozzle turned downward.

Another function performed by the novel connection of the faucet and the shank is that these parts can be easily and conveniently disconnected for the purpose of thoroughly cleansing the interior surfaces of the faucet, the coupling, and the screw-shank, which is frequently found very desirable, or for the purpose of making other connections with the shank.

It will be noticed that a portion of the bush is screw-threaded for connecting with the shank of the faucet, and that the portion beyond the screw-threads to the end of the bush, on its inside, is plane-surfaced and made tapering, so as to receive and hold in position a tapering wooden plug until ejected by the faucet pressing the plug from its seat out of the bush. This is the first instance that a tapering wooden plug has been employed in conjunction with a tapering plain opening in the bush of a faucet, and such a plug and seat is found to be more serviceable in retaining gases in a cask than in those faucets where a cylindrical seat and cylindrical plug, if wood or cork, is employed.

What I claim as new, and desire to secure by Letters Patent, is—

1. The combination of the tap-hole bush, having a screw-threaded bore or socket, with a faucet, D, separate screw-threaded shank $d$, and a coupling with right and left hand screw-threads, whereby the shank and faucet are united, substantially as set forth.

2. The tap-hole bush having a portion of its interior screw-threaded for connection with a faucet, and the internal portion beyond the screw-threads plain-surfaced and tapering from the screw-threads to the end of the bush, in combination with a tapering wooden plug, for operation substantially as shown and described.

In testimony whereof I have hereunto set my my hand and seal in the presence of two subscribing witnesses.

WILLIAM NEWCOMB. [L. S.]

Witnesses:
NAHUM NEWCOMB,
A. W. HERRINGTON.